United States Patent [19]
Garibay, Jr. et al.

[11] Patent Number: 5,572,682
[45] Date of Patent: Nov. 5, 1996

[54] CONTROL LOGIC FOR A SEQUENTIAL DATA BUFFER USING BYTE READ-ENABLE LINES TO DEFINE AND SHIFT THE ACCESS WINDOW

[75] Inventors: Raul A. Garibay, Jr.; Douglas E. Duschatko, both of Plano, Tex.

[73] Assignee: Cyrix Corporation, Richardson, Tex.

[21] Appl. No.: 863,227

[22] Filed: Apr. 3, 1992

[51] Int. Cl.⁶ .................. G06F 9/00; G06F 9/30
[52] U.S. Cl. .......... 395/250; 395/421.09; 364/DIG. 1; 364/238.7; 364/244.5; 364/262.4; 364/263.1; 364/DIG. 2; 364/947.6; 364/948; 377/81
[58] Field of Search .................. 395/375, 800, 395/775, 250, 421.09; 377/81

[56] References Cited

U.S. PATENT DOCUMENTS

| | | | |
|---|---|---|---|
| 4,627,024 | 12/1986 | Whalen et al. | 395/400 |
| 4,720,779 | 1/1988 | Reynard et al. | 395/700 |
| 4,953,121 | 8/1990 | Muller | 395/375 |
| 5,050,067 | 9/1991 | McLagan et al. | 395/700 |
| 5,113,515 | 5/1992 | Fite et al. | 395/425 |
| 5,317,701 | 5/1994 | Reininger et al. | 395/375 |

OTHER PUBLICATIONS

Murray et al. "Micro-Architecture of the VAX 9000", IEEE 1990 pp. 44–53.

Primary Examiner—Thomas C. Lee
Assistant Examiner—D. Dinh
Attorney, Agent, or Firm—Andrew S. Viger; John L. Maxin

[57] ABSTRACT

Shift-based control logic is used, in an exemplary embodiment, to implement in a microprocessor a circular prefetch queue that stores variable length instructions and transfers four instruction bytes at a time to an instruction decoder. The prefetch queue (10) includes a 16 byte sequential prefetch buffer (12). Access to the buffer is controlled by the shift-based control logic (14) which includes shifter logic that defines a four byte transfer window corresponding to an index byte together with the next three bytes in sequence. For each four-byte transfer operation, the shifter logic enables the four bytes within the transfer window to be read out for transfer to the instruction decoder (20). A transfer operation is initiated by the decoder, which presents the shift-based control logic with a bytes-used indicator, or shift increment. The shift increment denotes the number of bytes used by the previous four byte transfer via a four bit, one-hot selection. In response to receiving the shift increment, the control logic shifts the transfer window an amount specified by the shift increment in preparation for the next four byte transfer.

8 Claims, 3 Drawing Sheets

CONTROL LOGIC FOR A SEQUENTIAL DATA BUFFER USING BYTE READ-ENABLE LINES TO DEFINE AND SHIFT THE ACCESS WINDOW

BACKGROUND OF THE INVENTION

1. Field of the Invention

The invention relates generally to logic circuits, and more particularly relates to a design and method for implementing shift-based access control for a sequential data buffer in which data in the buffer is accessed by selectively incrementing an access window. In an exemplary embodiment, the invention is used in the design of a prefetch queue to permit accessing misaligned data (i.e., variable length instructions) for transfer to an instruction decoder.

2. Description of Related Art

Sequential data buffers are accessed by specifying an access index to an initial byte and an access size (or mask). For each new access, the index is incremented by a selected positive offset thereby incrementing a window of access-size bytes sequentially through the buffer.

Without limiting the scope of the invention, this background information is provided in the context of a specific problem to which the invention has application: improving the design of an instruction prefetch queue that stores variable length instructions to permit faster byte transfers to the instruction decoder.

Instruction prefetch is commonly used in microprocessors to optimize computer execution time. Prefetched instructions are input to a decoder for decoding, and then prodded to the CPU (central processing unit).

Prefetch logic includes a prefetch queue, which typically is a data buffer, such as a sequential or circular buffer, that holds a predetermined number of prefetched instruction bytes. For 32-bit microprocessor architectures (such as the 386) in which internal buses are 32 bits or four bytes (one double word) wide, typical sizes for prefetch queues are 16 bytes corresponding to four 4 byte double words (or in the case of prefetch from a cache, four 4 byte cache lines).

Instructions are typically of variable length—for the 386 and 486 architectures, instructions can be from 1 to 15 bytes in length. Thus, instructions in the prefetch queue will be misaligned. That is, for a 32-bit architecture in which the prefetch queue transfers 4 bytes at a time to the instruction decoder, except for instructions that are multiples of four bytes, the decoder 11 discard 1 to 3 bytes each instruction.

Typically, the decoder does not store the bytes discarded, even though those bytes represent the initial bytes of the next instruction. Thus, for each 4 byte transfer from the instruction prefetch queue, the decoder must advise the buffer control logic (BCL) of the number of bytes used (from 0 to 4 bytes). In response, the BCL will increment the index (initial byte) of 4 byte transfer window such that the first byte of the next 4 byte transfer to the decoder corresponds to the byte after the last one used by the decoder from the previous transfer.

The 4 byte transfer window is incremented through the prefetch queue by (a) encoding a bytes-used value, (b) adding this bytes-used code to the previous index code to increment the index, and then (c) decoding the new index code to increment the transfer window to the new index. That is, the instruction decoder provides a bytes-used code (typically, three bits) to the BCL, which adds the bytes-used code to the index code for the previous index, and then decodes the index code to determine the new index. The BCL increments to the new index, and correspondingly moves the transfer window in preparation for the next 4 byte transfer to the decoder.

Using the repositioned transfer window, the corresponding 4 bytes in the prefetch queue are selected for transfer to the instruction decoder. Three techniques are commonly employed: (a) single port—reading two 4- byte lines in sequence, and selecting the appropriate 4 transfer bytes; (b) two port—reading two lines in parallel and selecting the appropriate 4 transfer bytes; and (c) byte selection—the prefetch queue includes a read line for each byte, enabling the direct selection of the appropriate 4 transfer bytes from the prefetch queue.

The current approach to indexing the transfer window—encoding a bytes-used increment code, adding/incrementing the index code for the previous index, and decoding the new index code to increment the transfer window—is disadvantageous in terms of the time required to complete the transfer operation. As a result, the instruction decode operation, including transfers from the prefetch queue, may create a bottleneck that limits operational frequency.

Accordingly, a specific need exists for an improved design for the buffer control logic for a prefetch queue to enable faster byte transfers to the instruction decoder.

SUMMARY OF THE INVENTION

The invention is a design and method for implementing shift-based access control for a sequential buffer of Y bytes (or units). Each access operation accesses a selected sequence of X bytes (X<Y) by shifting an X-byte access window by a selected shift increment determined by a shift code provided by an external source.

In one aspect of the invention, the method for implementing shift-based access control for a sequential buffer involves: (a) defining an access window of X bytes in sequence such that access to data in the buffer is limited to those bytes within the access window, and (b) for each new access operation initiated by a new shift code from the external source, shifting the access window by the corresponding shift increment, such that the new index byte for the access window is shifted from the previous index byte by the selected shift increment.

In another aspect of the invention, shift-based control logic includes shifter logic that defines an access window that controls access to corresponding bytes in the buffer, including an index byte together with the next X−1 bytes in sequence, such that access to data in the buffer is limited to those bytes within the access window. For each new access operation initiated by a new shift code from the external source, the shifter logic shifts the access window by the corresponding shift increment, such that the new index byte is shifted from the previous index byte by the selected shift increment. Access logic then accesses the bytes in the sequential buffer within the access window.

In a further aspect of the invention, the shifter logic comprises, for each byte of the sequential buffer, a shift element that has a shift code input, X data inputs, and at least one output. For each shift element, the output is active only for those shift elements that define the access window, such that the outputs for a selected sequence of X shift elements are active, and the outputs for the remaining shift elements are inactive. The shift elements are intercoupled with the output of the Nth shift element being coupled to shift inputs 1, ..., X, respectively, of the N+1, ..., N+X shift elements. In operation, for the next transfer operation, each shift element activates/deactivates its output depending upon (a) the current state of its output, (b) the shift increment code, and (c) the outputs from the X preceding shift elements, such that the access window is incremented by the corresponding shift increment.

In an exemplary embodiment of the invention, the shift-based control logic is used to control access to a sequential instruction prefetch queue. In response to the shift code, the shifter logic increments a transfer window to enable byte transfers from the prefetch queue to an instruction decoder.

Prefetch logic transfers bytes to the instruction decoder in 4 byte transfers. The shift-based control logic selectively increments a 4 byte transfer window to read out 4 bytes at a time from a 16 byte circular prefetch queue.

For each 4 byte transfer, the instruction decoder determines the number of bytes used, and then generates a 5-bit bytes-used shift code—one bit for each byte of the 4 byte transfer and a fifth bit for explicitly encoding the unshifted case. The shift code is input directly to the shift-based control logic, without encoding or decoding, and without being added to the shift code for the previous transfer operation. Based on the shift code, the shifter logic shifts the 4 byte transfer window, such that the index for the transfer window corresponds to the first byte not used by the decoder in the previous 4-byte transfer.

The shifter logic comprises 16 shift elements, each providing a select output SEL that, when active, selects a corresponding one of the 16 bytes in the prefetch queue for read out in the next transfer operation. Each shift element (a) receives four data inputs corresponding to respective data outputs from the four preceding shift elements, as well as the shift increment code from the instruction decoder, and (b) provides a data output QX that is the inverse of the select output. At reset, the shifter logic is initialized by activating/deactivating the select outputs of the shift elements such that the transfer window is positioned with the index byte corresponding to one of the first four bytes in the prefetch queue.

The technical advantages of the invention include the following. The use of shift-based control logic allows the use of a shift code that can be directly input to the shifter logic, without any encoding/decoding or the need to add the new shift code to the previous index to obtain the new index. As a result, in the context of implementing shift-based control logic for a prefetch queue, transfers from the prefetch queue to the instruction decoder can be accomplished in less time.

For a more complete understanding of the invention, and for further features and advantages, reference is now made to the following Detailed Description of an exemplary embodiment of the invention, together with the accompanying Drawings.

DETAILED DESCRIPTION OF THE INVENTION

Figure 1:
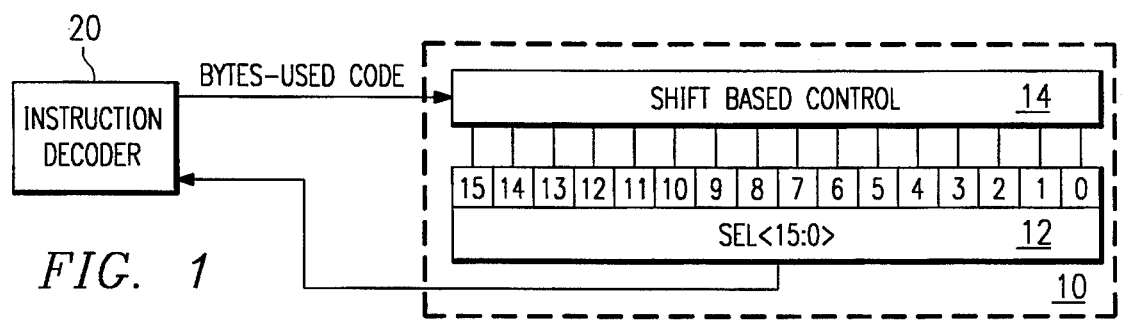
FIG. 1 is a general block diagram of a prefetch queue and associated shift-based control logic.

The detailed description of an exemplary embodiment of the shift-based control logic for a sequential data buffer is organized as follows: 1. Shift-Based Control Logic 1.1. Shifter Logic 1.2. Shift Element 1.3. Reset/Initialization 2. Conclusion The exemplary shift-based control logic is used to implement a 16 byte circular prefetch queue that stores variable length instructions, transferring 4 bytes at a time to an instruction decoder. 1. Shift-Based Control Logic FIG. 1 illustrates the shift-based control logic used to implement byte transfer operations between a circular prefetch queue 10 and an instruction decoder 20.

The prefetch queue 10 includes a 16 byte sequential prefetch buffer 12 in which access to the buffer is controlled by shift-based control logic 14. The shift-based control logic includes shifter logic that defines a 4 byte transfer window corresponding to an index byte together with the next 3 bytes in sequence. For each 4-byte transfer operation, the shifter logic enables the 4 bytes within the transfer window to be read out for transfer to the decoder 20.

A transfer operation is initiated by the decoder 20, which presents the shift-based control logic 14 with a bytes-used code designating the number of bytes used from the previous 4 byte transfer. This bytes-used code defines the increment by which the transfer window should be shifted for the next 4 byte transfer.

In response to the new bytes-used code, the control logic 14 shifts the transfer window by the corresponding shift increment, such that the new index byte is shifted from the previous index byte by the shift increment. Based on the new position of the transfer window, the control logic 14 enables the next 4 bytes to be read out of the prefetch queue 12 for transfer to the decoder 20.

Figure 2A:
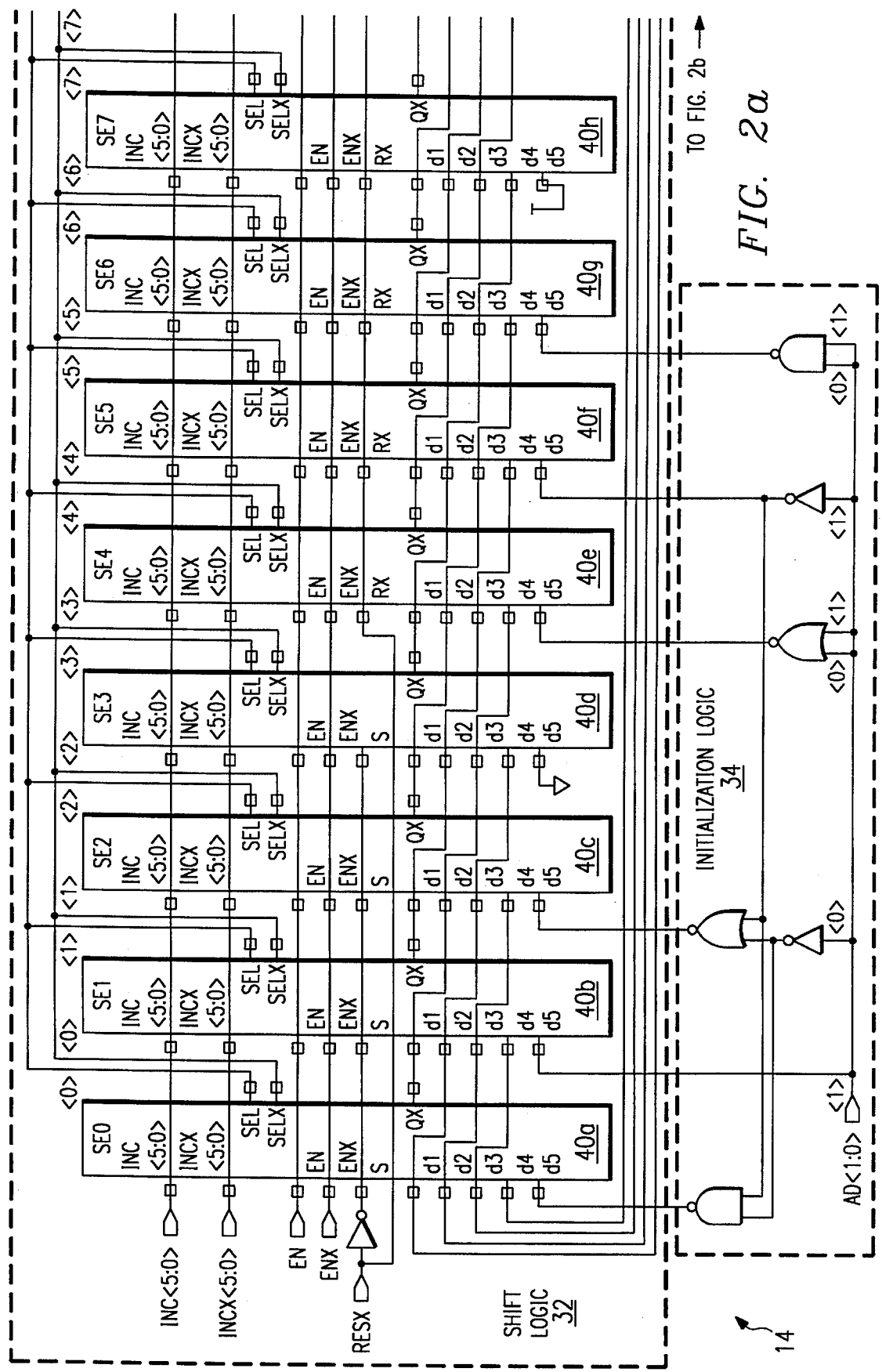
FIGS. 2a and 2b are schematic diagrams of the shift-based control logic used to control a circular prefetch queue.
Figure 2B:
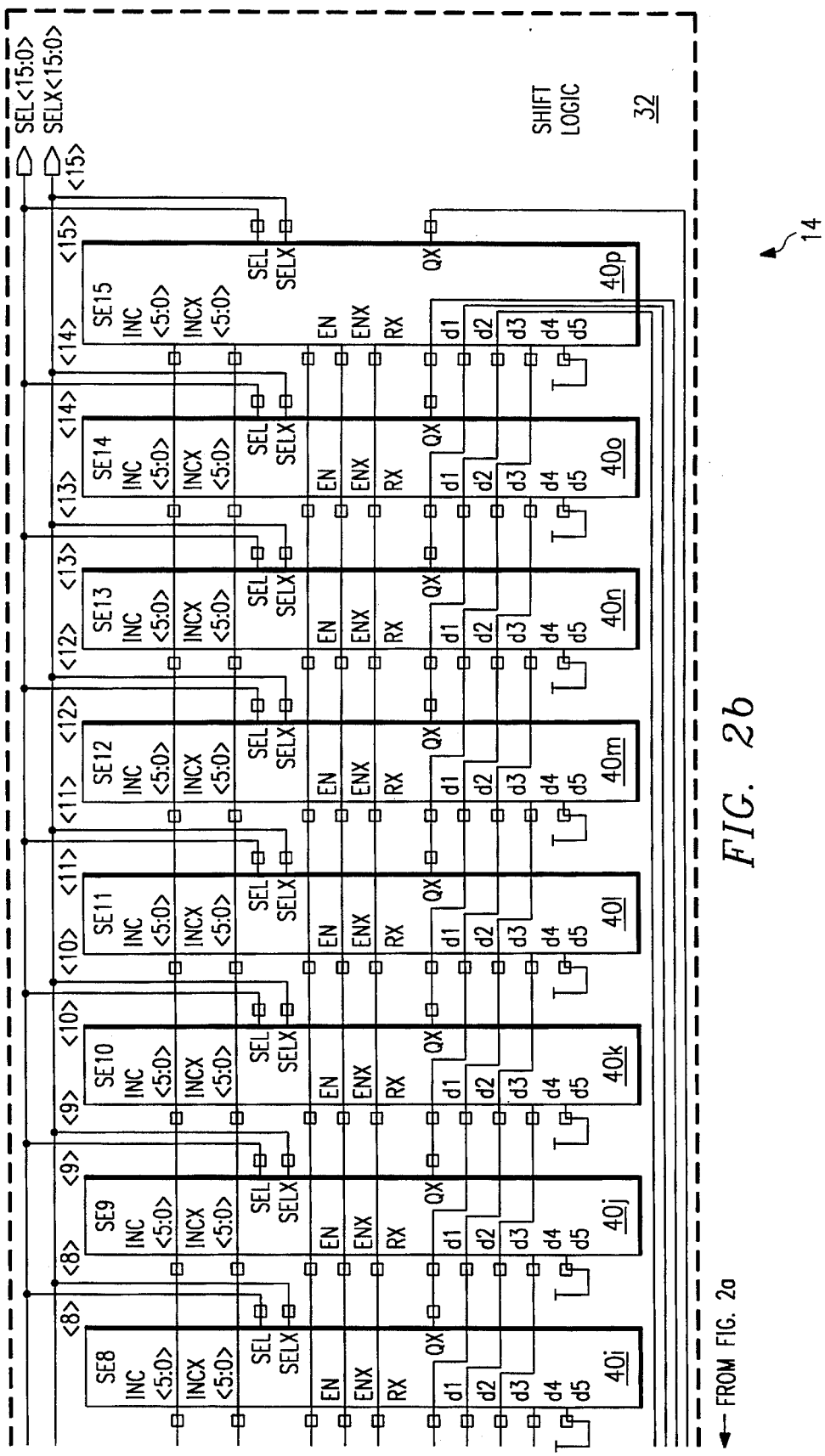

1.1. Shifter Logic FIGS. 2a and 2b illustrate exemplary shift-based control logic 14. The control logic is implemented using shifter logic 32 that includes 16 separate CMOS shift elements SE0–SE15 40a–p. Because the shifter logic implements a circular shift operation, shift element SE15 is considered to be adjacent the SE0.

Each of the shift elements controls the state of respective complementary select lines SEL/SELX<15:0> so as to define a 4 byte transfer window. That is, for any given transfer operation, the shifter logic activates 4 adjacent ones of the SEL/SELX select lines, with the remaining select lines being inactive. Logic in the prefetch queue is responsive to the state of the SEL/SELX select lines for reading out the corresponding sequence of 4 bytes in the prefetch queue for transfer to the decoder.

The shift elements SE0–SE15 are inter-coupled to provide circular shifter logic for controlling a circular prefetch buffer (12 in FIG. 1). For successive transfer operations each initiated by a bytes-used shift code from the instruction decoder (20 in FIG. 1), the 4 byte transfer window is incrementally shifted through the shift elements to enable 4 byte transfers from the prefetch queue.

The shift elements each receive a complementary 6 bit control code INC/INCX<5:0> from the instruction decoder. The least significant five bits <4:0> are used by the decoder to communicate the bytes used from the previous transfer operation, and therefore, the number of bytes by which the transfer window should be incremented for the next transfer. Specifically, these five bits define a shift increment code in which bits <4:1> indicate whether the decoder used one, two, three, or four bytes from the previous 4-byte transfer, requiring a corresponding shift of the transfer window for the next transfer, and bit <0> is an explicit encoding of the no-shift case (zero bytes used). The most significant bit <5> is used for initialization.

In addition to the control code inputs INC/INCX, each shift element SE0–SE15 has (a) four data inputs d1–d4 and an initialization input d5, and (b) a data output QX and complimentary select outputs SEL/SELX. The data output QX is the inverse of the select output SEL.

For each shift element, the data output QX is coupled respectively to the d1, d2, d3, and d4 inputs of the four succeeding shift elements to implement a 4 bit circular shift function. For the shift element SE0 40a, the QX output is coupled to the d1 input of SE140b, to the d2 input of SE240c, to the d3 input of SE340d, and to the d4 input of SE40e.

Thus, the d1–d4 data inputs for each shift element are coupled to the respective data outputs QX for the preceding shift elements. For the shift element SE040a, the d1 input is coupled to the QX output of SE1540p, the d2 input is coupled to QX of SE144o, the d3 input is coupled to QX of SE1340n, and the d4 input is coupled to QX of SE1240m.

In normal operation, for each 4 byte transfer to the instruction decoder, the shift elements SE0–SE15 define the transfer window by activating the corresponding sequence of four select lines SEL/SELX <15:0>, for example the select lines SEL/SELX <3:0> associated with shift elements SE0–SE3. To initiate the next 4 byte transfer, the decoder provides a control code INC/INCX <5:0>, including the 5 bit shift increment code <4:0> that indicates the number of bytes used from the previous 4 byte transfer.

Based on the shift increment code, the transfer window is correspondingly incremented to a new index position by controlling the shift elements to activate/deactivate appropriate ones of the select line outputs. In the example, if the decoder used 3 bytes from the previous transfer, the shift increment code would indicate a shift of three positions for the transfer window index, and (a) select lines for SEL/SELX <2:0> would be deactivated, leaving read line SEL/SELX <3> active, and (b) select lines SEL/SELX <6:4> would be activated, thereby defining a transfer window using shift elements SE3–SE6 which activate corresponding select lines SEL/SELX <6:3>.

Figure 3:
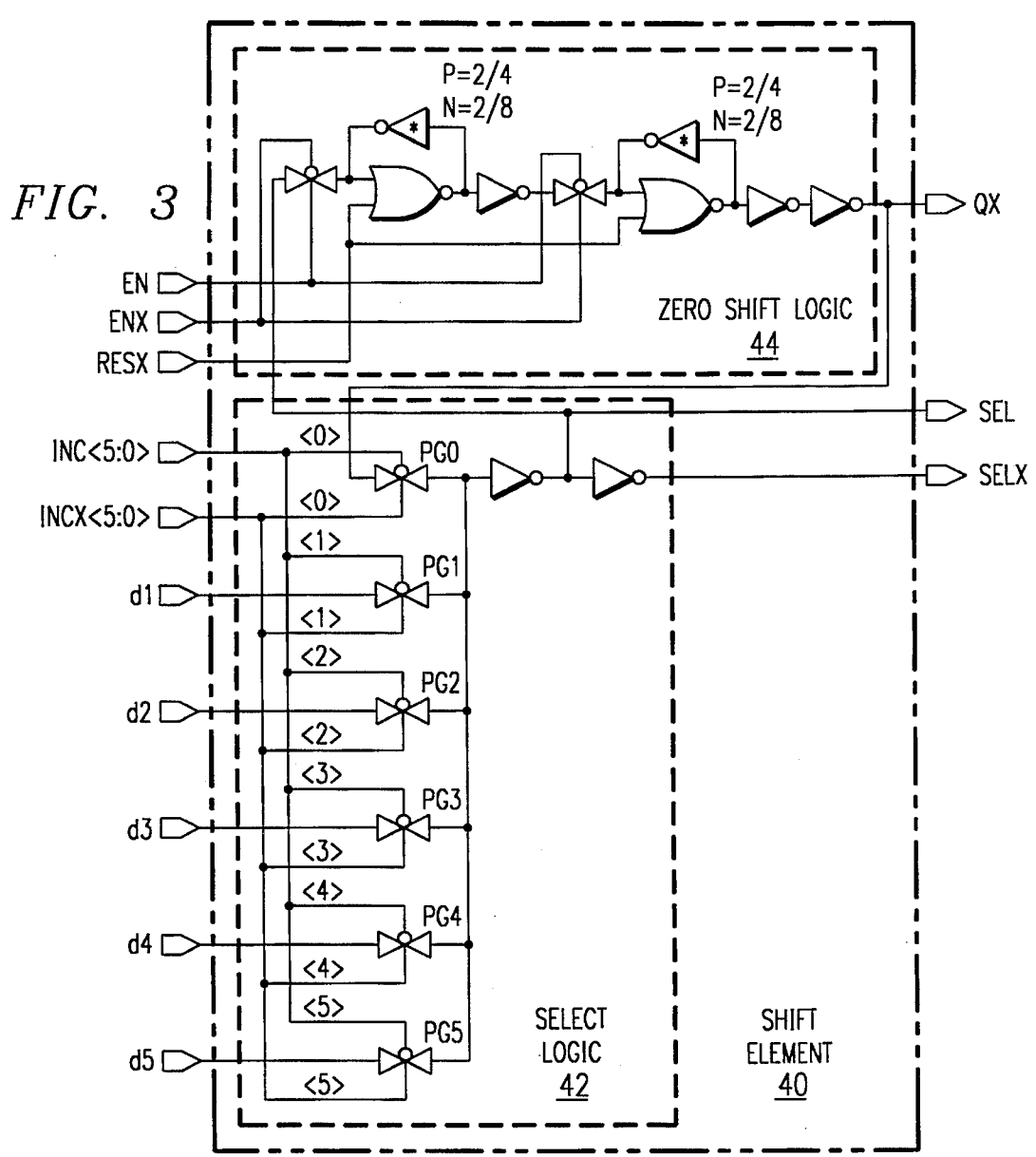
FIG. 3 is a schematic diagram of one shift element of the shift-based control logic.

1.2. Shift Elements FIG. 3 illustrates one of the shift elements 40, which includes selection logic 42 and zero shift logic 44. The selection logic activates/deactivates the read line SEL/SELX for the shift element, and in conjunction with the zero shift logic, causes the state of the QX output to be the inverse of the select output SEL. The zero shift logic is used in the no-shift case (i.e., shift-by-zero) to hold the current state of the select outputs SEL/SELX and the data output QX.

Selection logic 42 receives as inputs the control code INC/INCX <5:0> from the decoder, the four data inputs d1–d4, and the initialization input d5. The selection logic includes six CMOS pass gates PG0–PG5, each controlled by respective complementary pairs of the control code bits INC/INCX <5:0>. The input to pass gates PG1–PG5 are provided respectively by the data inputs d1–d4 and the initialization input d5, while the input to pass gate PG0 is provided by the output of the zero shift logic.

The zero shift logic 44 is a master/slave flip-flop that receives as an input the select output SEL. The output of the flip-flop is input to the pass gate PGO associated with the zero-shift case. EN/ENX are latch control signals, and the RESX input is a reset input.

In operation, for the next transfer operation, the shift element 40 will activate/deactivate its select outputs SEL/SELX depending upon the inputs/outputs from the current transfer operation: (a) the state of the select outputs, (b) the control code INC/INCX <5:0> including the shift increment code input INC/INCX <4:0> provided by the decoder, and (c) the data outputs QX from the four preceding shift elements, which are input respectively to data inputs d1–d4. Specifically, the data output QX for the current transfer operation is the inverse of the select output for the next transfer operation.

For example, assume that for the current transfer operation, shift element 40 corresponds to the third byte of the 4 byte transfer window, and that the decoder has used two of the four bytes transferred. The select output SEL will be active (high), and the data output QX will be low, while the data inputs d1–d2 will be low (because the preceding two shift elements have active select outputs making their QX outputs low) and the data inputs d3–d4 will be high. The shift increment code indicating a two position shift in the transfer window will initiate the next transfer operation, selecting data input d2 to indicate that the last byte used from the previous window was byte 2. As a result, pass gate PG2 will turn on, passing the low value on data input d2 to the output, and maintaining the select output for the shift element active, such that the shift element will select the first byte of the next 4 byte transfer to the instruction decoder.

1.3. Reset/Initialization Referring to FIG. 2a, the shift-based control logic 14 includes a reset input RESX. At reset, the shift elements SE0–SE3 are selected, while the remaining shift elements are deselected.

At reset, initialization logic 34 is used to initialize the position of the transfer window such that it indexes to any of the first four bytes. This logic couples to the initialization inputs d5 of shift elements SE0–SE2 and SE4–SE6 (the initialization input for SE3 is grounded). The initialization d5 inputs for the remaining shift elements SE7–SE15 are tied to VCC such that these shift elements will not be activated by the initialization procedure.

For the exemplary embodiment, in response to an initialization input AD <1:0>after reset, the initialization logic selects as the index position for the transfer window one of the shift elements SE0–SE3 (SE3 is selected by deselecting each of SE0–SE3), and then selecting corresponding ones of shift elements SE4–SE6 to complete the 4 byte transfer window.

2. Conclusion Although the Detailed Description of the invention has been directed to certain exemplary embodiments, various modifications of these embodiments, as well as alternative embodiments, will be suggested to those skilled in the art. For example, while the exemplary embodiment has been described in terms of control logic for reading bytes from a sequential buffer, the invention has general application to control logic for implementing any type of access to data such a sequential buffer.

It is to be understood that the invention encompasses any modifications or alternative embodiments that fall within the scope of the appended claims.

What is claimed is:

1. A sequential buffer with shift-based control logic for accessing sequences of X bytes out of a total of Y bytes in the sequential buffer (X<Y) to provide an X-byte transfer to a transfer requester, comprising:

(a) shifter logic that defines an access window encompassing an X-byte sequence in the sequential buffer, including an index byte together with the next X−1 bytes in sequence, such that access to data in the buffer is limited to those bytes within the access window;

(b) for each byte of the sequential buffer, the shifter logic including a read-enables element that, when active, enables access to such byte;

(c) the shifter logic defining the access window by activating the read-enable element corresponding to an index byte together with the next X−1 read-enable elements corresponding to the next X−1 bytes, with the remaining read-enable elements being inactive; and (d) access logic that, for each transfer operation, accesses the bytes in the sequential buffer within the access window for transfer to the transfer requester;

(e) the transfer requester initiating a transfer operation by providing a shift increment, such shift increment communicating the X bytes used in an immediately preceding transfer operation;

(f) for each transfer operation, (i) the shifter logic, responding to the shift increment, shifts the access window by the shift increment by activating and deactivating selected read-enable elements, such that a new index byte is shifted from a previous index byte by the shift increment, and (ii) the access logic accesses the corresponding bytes within the access window for transfer to the transfer requester.

2. The sequential buffer of claim 1, wherein the shift increment is, and wherein the shifter logic comprises:

(a) for each byte of the sequential buffer, a shift element that has a shift code input, X data inputs, and at least one output;

(b) for each shift element, the at least one output being active only for those shift elements that define the access window, such that, for a selected X byte sequence, the corresponding X shift elements have active outputs while the outputs for the other shift elements are inactive;

(c) the shift elements being coupled together, with the at least one output of the Nth shift element being coupled to shift inputs, respectively, of the N+1, N+2, ..., N+X shift elements;

(d) such that, for each transfer operation, each shift element activates/deactivates its output depending upon (i) the current state of its output, (ii) the shift increment, and (iii) the outputs from the X preceding shift elements, thereby incrementing the access window by the corresponding shift increment.

3. The sequential buffer of claim 1, further comprising initialization logic that initializes the index position of the access window at a selected byte position, thereby defining the initial X byte sequence accessed by the access logic.

4. The sequential buffer of claim 1, wherein the sequential buffer comprises a prefetch buffer for storing prefetched instruction bytes, and wherein the transfer request logic comprises decoder logic that decodes instructions from instruction bytes.

5. A sequential buffer with shift-based control logic for accessing sequences of X bytes out of a total of Y bytes in the buffer (X<Y) to provide an X-byte transfer to transfer request means, comprising:

(a) shift-control means for defining an access window encompassing an X-byte sequence in the buffer, including an index byte together with the next X−1 bytes in sequence, such that access to data in the buffer is limited to those bytes encompassed by the access window; and (b) for each byte of the sequential buffer, the shift control means including read-enable means for enabling, when active, access to such byte;

(c) shift-control means defining the access window by activating the read-enable means corresponding to an index byte together with the next X−1 read-enable means corresponding to the next X−1 bytes, with the remaining read-enable means being inactive; and (d) access means for accessing, for each transfer operation, the bytes in the sequential buffer within the access window for transfer to the transfer request means;

(e) the transfer request means initiating a transfer operation by providing a shift increment, such shift increment communicating the X bytes used in an immediately preceding transfer operation;

(f) for each transfer operation, (i) the shift-control means, in response to the shift increment, shifts the access window by an amount corresponding to the shift increment by activating and deactivating selected read-enable elements, such that a new index byte is shifted from a previous index byte by the selected shift increment, and (ii) the access means accesses the corresponding bytes within the access window for transfer to the transfer request means.

6. The sequential buffer of claim 5, wherein the shift increment is, and wherein the shift-control means comprises:

(a) for each byte of the sequential buffer, a shift element that has a shift code input, X data inputs, and at least one output;

(b) for each shift element, the at least one output being active only for those shift elements that define the access window, such that, for a selected X byte sequence, the corresponding X shift elements have active outputs while the outputs for the other shift elements are inactive;

(c) the shift elements being coupled together, with the at least one output of the Nth shift element being coupled to shift inputs, respectively, of the N+1, N+2, ..., N+X shift elements;

(d) such that, for each transfer operation, each shift element activates/deactivates its output depending upon (i) the current state of its output, (ii) the shift increment, and (iii) the outputs from the X preceding shift elements, thereby incrementing the access window by the corresponding shift increment.

7. The sequential buffer of claim 5, further comprising initialization means for initializing the index position of the access window at a selected byte position, thereby defining the initial X byte sequence accessed by the access logic.

8. The sequential buffer of claim 5, wherein the sequential buffer comprises a prefetch buffer for storing prefetched instruction bytes, and wherein the transfer request means comprises decoder means for decoding instructions from instruction bytes.

* * * * *